(12) United States Patent
Osborn et al.

(10) Patent No.: US 12,299,672 B2
(45) Date of Patent: May 13, 2025

(54) SYSTEM AND METHOD FOR AUTHENTICATION WITH TRANSACTION CARDS

(71) Applicant: Capital One Services, LLC, McLean, VA (US)

(72) Inventors: Kevin Osborn, Newton Highlands, MA (US); Jeffrey Rule, Chevy Chase, MD (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/128,582

(22) Filed: Mar. 30, 2023

(65) Prior Publication Data

US 2024/0330896 A1 Oct. 3, 2024

(51) Int. Cl.
G06Q 20/34 (2012.01)
H04L 9/08 (2006.01)

(52) U.S. Cl.
CPC ......... *G06Q 20/352* (2013.01); *H04L 9/0825* (2013.01); *H04L 9/0869* (2013.01); *H04L 2209/56* (2013.01)

(58) Field of Classification Search
CPC ... G06Q 20/352; H04L 9/0825; H04L 9/0869; H04L 2209/56
USPC .......................................................... 705/41
See application file for complete search history.

(56) References Cited

U.S. PATENT DOCUMENTS

| | | | |
|---|---|---|---|
| 4,683,553 A | 7/1987 | Mollier | |
| 4,827,113 A | 5/1989 | Rikuna | |
| 4,910,773 A | 3/1990 | Hazard et al. | |
| 5,036,461 A | 7/1991 | Elliott et al. | |
| 5,363,448 A | 11/1994 | Koopman, Jr. et al. | |
| 5,377,270 A | 12/1994 | Koopman, Jr. et al. | |
| 5,533,126 A | 7/1996 | Hazard | |
| 5,537,314 A | 7/1996 | Kanter | |
| 5,592,553 A | 1/1997 | Guski et al. | |
| 5,616,901 A | 4/1997 | Crandall | |
| 5,666,415 A | 9/1997 | Kaufman | |

(Continued)

FOREIGN PATENT DOCUMENTS

| | | | |
|---|---|---|---|
| CA | 3010336 | 7/2017 | |
| CA | 3158054 A1 * | 7/2021 | ............. G06F 21/34 |

(Continued)

OTHER PUBLICATIONS

Batina, Lejla and Poll, Erik, "SmartCards and RFID," PowerPoint Presentation for IPA Security Course, Digital Security at University of Nijmegen, Netherlands (date unknown), 75 pages.

(Continued)

*Primary Examiner* — Hai Tran
(74) *Attorney, Agent, or Firm* — KDW Firm PLLC; Andrew D. Kasnevich

(57) ABSTRACT

The present embodiments describe systems and methods for resynchronizing a counter value associated with a contactless card. The system includes a card, a client device, a client device application, and a server. The method includes generating a cryptogram including the counter value, transmitting the cryptogram to the client device, decrypting the cryptogram and thus acquiring the counter value. This method provides a quick and easy way to verify and re-sync the counter value between a card, a server, and a client device.

19 Claims, 10 Drawing Sheets

System 100

(56) References Cited

U.S. PATENT DOCUMENTS

| | | |
|---|---|---|
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Mamdani et al. |
| 8,005,426 B2 | 8/2011 | Huomo et al. |
| 8,010,405 B1 | 8/2011 | Bortolin et al. |
| RE42,762 E | 9/2011 | Shin |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Vernon et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |

(56) References Cited

U.S. PATENT DOCUMENTS

| | | |
|---|---|---|
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | De Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | Von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |

(56) References Cited

U.S. PATENT DOCUMENTS

| | | |
|---|---|---|
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Amiel et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0030649 A1* | 2/2010 | Ubelhor ............ G06Q 30/0269 705/14.66 |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0302409 A1 | 10/2015 | Malek |
| 2015/0317626 A1 | 11/2015 | Ran et al. |
| 2015/0332266 A1 | 11/2015 | Friedlander et al. |

(56) References Cited

U.S. PATENT DOCUMENTS

| | | |
|---|---|---|
| 2015/0339474 A1 | 11/2015 | Paz et al. |
| 2015/0339664 A1* | 11/2015 | Wong .................. H04L 63/0823 705/71 |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0238517 A1* | 8/2019 | D'Agostino ........ H04L 63/0428 |
| 2020/0104841 A1* | 4/2020 | Osborn .................. G06Q 20/12 |
| 2020/0376373 A1 | 12/2020 | Amaitis et al. |
| 2021/0192300 A1* | 6/2021 | Rule .................... G06Q 20/352 |

FOREIGN PATENT DOCUMENTS

| | | | |
|---|---|---|---|
| CN | 101192295 | 6/2008 | |
| CN | 103023643 | 4/2013 | |
| CN | 103417202 | 12/2013 | |
| EP | 1 085 424 | 3/2001 | |
| EP | 1 223 565 | 7/2002 | |
| EP | 1 265 186 | 12/2002 | |
| EP | 1 783 919 | 5/2007 | |
| EP | 2 852 070 | 1/2009 | |
| EP | 2 139 196 | 12/2009 | |
| EP | 1 469 419 | 2/2012 | |
| FR | 2881900 A1 * | 8/2006 | ........... H04L 9/0631 |
| GB | 2 457 221 | 8/2009 | |
| GB | 2 516 861 | 2/2015 | |
| GB | 2 551 907 | 1/2018 | |
| KR | 101508320 | 4/2015 | |
| WO | WO 00/49586 | 8/2000 | |
| WO | WO 2006070189 | 7/2006 | |
| WO | WO 2008055170 | 5/2008 | |
| WO | WO 2009025605 | 2/2009 | |
| WO | WO 2010049252 | 5/2010 | |
| WO | WO 2011112158 | 9/2011 | |
| WO | WO 2012001624 | 1/2012 | |
| WO | WO 2013039395 | 3/2013 | |
| WO | WO 2013155562 | 10/2013 | |
| WO | WO 2013192358 | 12/2013 | |
| WO | WO 2014043278 | 3/2014 | |
| WO | WO 2014170741 | 10/2014 | |
| WO | WO 2015179649 | 11/2015 | |
| WO | WO 2015183818 | 12/2015 | |
| WO | WO 2016097718 | 6/2016 | |
| WO | WO 2016160816 | 10/2016 | |
| WO | WO 2016168394 | 10/2016 | |
| WO | WO 2017042375 | 3/2017 | |
| WO | WO 2017042400 | 3/2017 | |
| WO | WO 2017157859 | 9/2017 | |
| WO | WO 2017208063 | 12/2017 | |
| WO | WO 2018063809 | 4/2018 | |
| WO | WO 2018137888 | 8/2018 | |

OTHER PUBLICATIONS

Haykin M. and Warnar, R., "Smart Card Technology: New Methods for Computer Access Control," Computer Science and Technology NIST Special Publication 500-157:1-60 (1988).

Lehpamer, Harvey, "Component of the RFID System," RFID Design Principles, 2nd edition pp. 133-201 (2012).

Pourghomi, Pardis et al., "A Proposed NFC Payment Application," International Journal of Advanced Computer Science and Applications, vol. 4, No. 8 (2013).

Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.

Author Unknown, "Visa® Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

(56) References Cited

OTHER PUBLICATIONS

Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author unknown, "NFC Guide: All You Need to Know About Near Field Communication" Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K, "Goldbug Big Seven open source crypto-messengers to be compared - : or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song, F., and Yun, A.I, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from the Internet URL: http://isis.poly.edu/courses/cs6903/Lectures/lecture10.pdf, 8 pages.

Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.

Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD?_ encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone" Conference paper (2013) IEEE Africon at Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera SLAM", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author unknown: "onetappayment™", [online] Jan. 24, 2019, [retrieved on Mar. 25, 2019]. Retrieved from Internet URL: https://www.payubiz.in/onetap, 4 pages.

Vu et al., (2012). "Distinguishing users with capacitive touch communication" Proceedings of the Annual International Conference on Mobile Computing and Networking, MOBICOM. 10.1145/2348543.2348569.

EMVCo, EMV Card Personalization Specification, version 1.0 (Jun. 2003), 81 pages.

Ullmann et al., (2012). "On-Card" User Authentication for Contactless Smart Cards based on Gesture Recognition, LNI, 223-234, 12 pages.

Faraj et al. (2008). "Investigation of Java Smart Card Technology for Multi-Task Applications" J. of Al-Anbar University for Pure Science, vol. 2: No. 1: 2008, 11 pages.

Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.

The International Search Report and Written Opinion mailed Apr. 15, 2024, for related PCT/US2024/020670 (eight (8) pages).

\* cited by examiner

SYSTEM AND METHOD FOR AUTHENTICATION WITH TRANSACTION CARDS

FIELD OF DISCLOSURE

The present disclosure relates generally to authentication systems and methods associated with transaction cards.

BACKGROUND

Transactions cards, such as credit cards, debit cards, and gift cards, are frequently used for both online and offline transactions. The use of transaction cards is growing increasingly popular, and many users carry multiple transactions cards at any given time. As their popularity increases, transaction cards have also been increasingly targeted for fraud and other malicious activity.

Cryptography can be implemented to protect data communicated to and from transaction cards to reduce the risk that attempts at fraud and other malicious activity will be successful. However, cryptographic protections can reduce transaction efficiency, encounter errors during operation, and degrade the user experience.

These and other deficiencies exist. Therefore, there is a need to provide systems and methods that overcome these deficiencies and provide for the authentication of transaction cards.

SUMMARY OF THE DISCLOSURE

Embodiments of the present disclosure provide a method for synchronizing a counter value. The method includes with receiving, by a contactless card having a processor and memory, a random number. The memory further comprises a counter value, a public key, and a private key. Next, the contactless card can generate a cryptogram based on the random number, the private key, and the counter value. The cryptogram is further configured to be decrypted by one or more applications via a public key corresponding to the private key. Furthermore, the decryption of the cryptogram results in finding the counter value. Furthermore, the counter value is further configured to be stored in a memory and server.

Embodiments of the present disclosure also provide a system for synchronizing a counter value. The system comprises a contactless card having a processor and memory. The memory of the contactless card contains a counter value, a public key, and a private key. The contactless card can receive a random number. Next, the card can generate a cryptogram based on the random number, the private key, and the counter value. The cryptogram is further configured to be decrypted by one or more applications via a public key corresponding to the private key. The decryption of the cryptogram results in finding the counter value. The counter value is further configured to be stored in a memory and server.

Embodiments of the present disclosure also provide a computer readable non-transitory medium comprising computer executable instructions that, when executed on a processor, configure the processor to perform procedures comprising the following: The procedures can begin with receiving a random number. Next, the procedures continue with generating a cryptogram based on a random number, a private key, and a counter value. The cryptogram is further configured to be decrypted by one or more applications via a public key corresponding to the private key. The decryption of the cryptogram results in finding the counter value. The counter value is further configured to be stored in a memory and server.

Further features of the disclosed systems and methods, and the advantages offered thereby, are explained in greater detail hereinafter with reference to specific example embodiments illustrated in the accompanying drawings.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Figure 1:
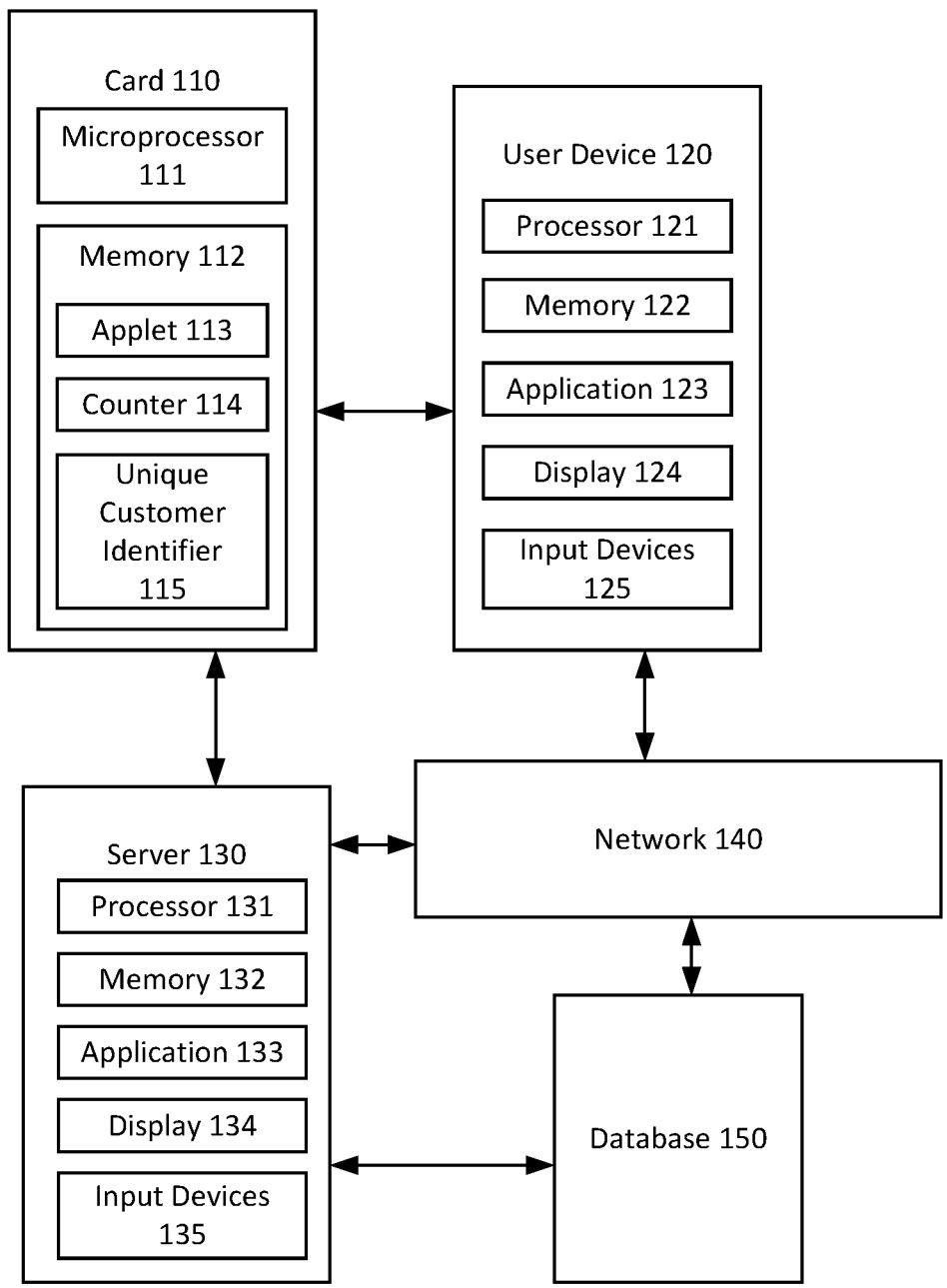
FIG. 1 is a block diagram illustrating a system according to an exemplary embodiment.

Exemplary embodiments of the invention will now be described in order to illustrate various features of the invention. The embodiments described herein are not intended to be limiting as to the scope of the invention, but rather are intended to provide examples of the components, use, and operation of the invention.

Furthermore, the described features, advantages, and characteristics of any of the embodiments may be interchangeably combined with the features, advantages, and characteristics of any of the other embodiments. One skilled in the relevant art will recognize that the embodiments may be practiced with or without one or more of the specific features or advantages of an embodiment and additional features and advantages may be recognized in certain embodiments that may not be present in all embodiments.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes. The invention should therefore not be limited by the above described embodiments, method, and examples, but by all embodiments within the scope and spirit of the invention as claimed.

As used herein, user information, personal information, and sensitive information can include any information relating to the user, such as a private information and non-private information. Private information can include any sensitive data, including financial data (e.g., account information, account balances, account activity), personal information/personally-identifiable information (e.g., social security number, home or work address, birth date, telephone number, email address, passport number, driver's license number), access information (e.g., passwords, security codes, authorization codes, biometric data), and any other information that the user may desire to avoid revealing to unauthorized persons. Non-private information can include any data that is publicly known or otherwise not intended to be kept private.

In cryptography, a counter value is a numeric integer used to further improve the security of a cryptographically-protected transaction. Generally, the counter value changes with every transaction so that every transaction is uniquely protected. For example, a transmitting device and a receiving device will attempt to authenticate the user's identity for a transaction. The transmitting device will update the counter, e.g. increasing the counter by one, and encrypt an authentication credential over the counter value as well as one or more keys. By using the counter value to encrypt the authentication credential, the transmitting device guarantees that each authentication credential is unique to a specific transaction. Thus, an interfering party will find it very difficult to decrypt the authentication credential for any particular transaction let alone derive any key from said transaction.

Despite their advantages, counter values can be difficult under some circumstances. The counter value method relies on both the transmitting device and the receiving to be in sync regarding the counter value. Unfortunately, one or both of the device can become out of sync, thus preventing the user from performing a transaction. For example, the card can perform an offline transaction with a card reader. Though the card will increment its counter, the issuer associated with card will not increment its record of the counter. If the card is then used to perform an online transaction, the counter on the card and the counter from the issuer may be out of sync. This deficiency creates confusion and frustration in the user, and it could compel intervention from a more technologically intensive procedure to re-sync the devices.

Generally, the following embodiments include systems and methods for re-syncing a counter value between a transmitting device and receiving device. The transmitting device can be a contactless card provisioned with a counter value. The receiving device can be a user device or client device such as a smart phone or computer. Additionally, the system can include a server. The contactless card and the client device are provisioned with the same master key. To begin, the client device sends a randomly generated number to the contactless card via an NFC field. Upon receiving the random number, the card generates a cryptogram based on the random number. The cryptogram contains the counter value. The card transmits the cryptogram to the client device. The client device decrypts the cryptogram and gets the counter value. Having gotten the counter value from the card, the client device stores the counter value and sends it to the server. Thus, both the client device and the server are both in sync with the counter value from the card.

The systems and methods prevent and remediates a situation where the card and the client device become de-synced. This method provides a simple, quick process for re-syncing the card and the client device, thus preventing user confusion and frustration. Additionally, the security provided by the method ensures a secure process for validating the card. By storing the counter value in the client device, the system allows the client device to quickly verify whether the card has become de-synced. Furthermore, the client device can determine more quickly whether a nefarious party is trying to perform a transaction. For example, a nefarious party may be trying to perform a transaction with the card's information, but the transaction is using an incorrect counter number. The client device can then recognize that the counter number is incorrect and reject the transaction.

FIG. 1 is a block diagram illustrating a system according to an exemplary embodiment.

FIG. 1 illustrates a system 100 according to an example embodiment. The system 100 may comprise a contactless card 110, a user device 120, a server 130, a network 140, and a database 150. Although FIG. 1 illustrates single instances of components of system 100, system 100 may include any number of components.

System 100 may include one or more contactless cards 110 which are further explained below with reference to FIG. 2 and FIG. 3. In some embodiments, contactless card 110 may be in wireless communication, utilizing NFC in an example, with user device 120.

System 100 may include a user device 120. The user device 120 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, an automatic teller machine (ATM), or other computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The user device 120 may include a processor 121, a memory 122, and an application 123. The processor 121 may be a processor, a microprocessor, or other processor, and the user device 120 may include one or more of these processors. The processor 121 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 121 may be coupled to the memory 122. The memory 122 may be a read-only memory, write-once read-multiple memory or read/write memory, e.g., RAM, ROM, and EEPROM, and the user device 120 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 122 may be configured to store one or more software applications, such as the application 123, and other data, such as users' private data and financial account information.

The application 123 may comprise one or more software applications, such as a mobile application and a web browser, comprising instructions for execution on the user device 120. In some examples, the user device 120 may execute one or more applications, such as software applications, that enable, for example, network communications with one or more components of the system 100, transmit and/or receive data, and perform the functions described herein. Upon execution by the processor 121, the application 123 may provide the functions described in this specification, specifically to execute and perform the steps and functions in the process flows described below. Such processes may be implemented in software, such as software modules, for execution by computers or other machines. The application 123 may provide graphical user interfaces (GUIs) through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The user device 120 may further include a display 124 and input devices 125. The display 124 may be any type of device for presenting visual information such as a computer monitor, a flat panel display, and a mobile device screen, including liquid crystal displays, light-emitting diode displays, plasma panels, and cathode ray tube displays. The input devices 125 may include any device for entering information into the user device 120 that is available and supported by the user device 120, such as a touch-screen, keyboard, mouse, cursor-control device, touch-screen, microphone, digital camera, video recorder or camcorder. These devices may be used to enter information and interact with the software and other devices described herein.

System 100 may include a server 130. The server 130 may be a network-enabled computer device. Exemplary network-enabled computer devices include, without limitation, a server, a network appliance, a personal computer, a workstation, a phone, a handheld personal computer, a personal digital assistant, a thin client, a fat client, an Internet browser, a mobile device, a kiosk, a contactless card, or other computer device or communications device. For example, network-enabled computer devices may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 130 may include a processor 131, a memory 132, and an application 133. The processor 131 may be a processor, a microprocessor, or other processor, and the server 130 may include one or more of these processors. The processor 131 may include processing circuitry, which may contain additional components, including additional processors, memories, error and parity/CRC checkers, data encoders, anti-collision algorithms, controllers, command decoders, security primitives and tamper-proofing hardware, as necessary to perform the functions described herein.

The processor 131 may be coupled to the memory 132. The memory 132 may be a read-only memory, write-once read-multiple memory or read/write memory, e.g., RAM, ROM, and EEPROM, and the server 130 may include one or more of these memories. A read-only memory may be factory programmable as read-only or one-time programmable. One-time programmability provides the opportunity to write once then read many times. A write-once read-multiple memory may be programmed at a point in time after the memory chip has left the factory. Once the memory is programmed, it may not be rewritten, but it may be read many times. A read/write memory may be programmed and re-programed many times after leaving the factory. It may also be read many times. The memory 132 may be configured to store one or more software applications, such as the application 133, and other data, such as users' private data and financial account information.

The application 133 may comprise one or more software applications comprising instructions for execution on the server 130. In some examples, the server 130 may execute one or more applications, such as software applications, that enable, for example, network communications with one or more components of the system 100, transmit and/or receive data, and perform the functions described herein. Upon execution by the processor 131, the application 133 may provide the functions described in this specification, specifically to execute and perform the steps and functions in the process flows described below. For example, the application 133 may be executed to perform receiving web form data from the user device 120 and the card 110, retaining a web session between the user device 120 and the card 110, and masking private data received from the user device 120 and the card 110. Such processes may be implemented in software, such as software modules, for execution by computers or other machines. The application 133 may provide GUIs through which a user may view and interact with other components and devices within the system 100. The GUIs may be formatted, for example, as web pages in HyperText Markup Language (HTML), Extensible Markup Language (XML) or in any other suitable form for presentation on a display device depending upon applications used by users to interact with the system 100.

The server 130 may further include a display 134 and input devices 135. The display 134 may be any type of device for presenting visual information such as a computer monitor, a flat panel display, and a mobile device screen, including liquid crystal displays, light-emitting diode displays, plasma panels, and cathode ray tube displays. The input devices 135 may include any device for entering information into the server 130 that is available and supported by the server 130, such as a touch-screen, keyboard, mouse, cursor-control device, microphone, digital camera, video recorder or camcorder. These devices may be used to enter information and interact with the software and other devices described herein.

System 100 may include one or more networks 140. In some examples, the network 140 may be one or more of a wireless network, a wired network or any combination of wireless network and wired network, and may be configured to connect the user device 120, the server 130, the database 150 and the card 110. For example, the network 140 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network 140 may include, without limitation, telephone lines, fiber optics, IEEE Ethernet 902.3, a wide area network, a wireless personal area network, a LAN, or a global network such as the Internet. In addition, the network 140 may support an Internet network, a wireless communication network, a cellular network, or the like, or any combination thereof. The network 140 may further include one network, or any number of the exemplary types of networks mentioned above, operating as a stand-alone network or in cooperation with each other. The network 140 may utilize one or more protocols of one or more network elements to which they are communicatively coupled. The network 140 may translate to or from other protocols to one or more protocols of network devices. Although the network 140 is depicted as a single network, it should be appreciated that according to one or more examples, the network 140 may comprise a plurality of interconnected networks, such as, for example, the Internet, a service provider's network, a cable television network, corporate networks, such as credit card association networks, and home networks. The network 140 may further comprise, or be configured to create, one or more front channels, which may be publicly accessible and through which communications may be observable, and one or more secured back channels, which may not be publicly accessible and through which communications may not be observable.

System 100 may include a database 150. The database 150 may be one or more databases configured to store data, including without limitation, private data of users, financial accounts of users, identities of users, transactions of users, and certified and uncertified documents. The database 150 may comprise a relational database, a non-relational database, or other database implementations, and any combination thereof, including a plurality of relational databases and non-relational databases. In some examples, the database 150 may comprise a desktop database, a mobile database, or an in-memory database. Further, the database 150 may be hosted internally by the server 130 or may be hosted externally of the server 130, such as by a server, by a cloud-based platform, or in any storage device that is in data communication with the server 130.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a non-transitory computer-accessible medium (e.g., RAM, ROM, hard drive, or other storage device). For example, a computer-accessible medium can be part of the memory of the contactless card 110, the user device 120, the server 130, the network 140, and the database 150 or other computer hardware arrangement.

In some examples, a computer-accessible medium (e.g., as described herein, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

Figure 2:
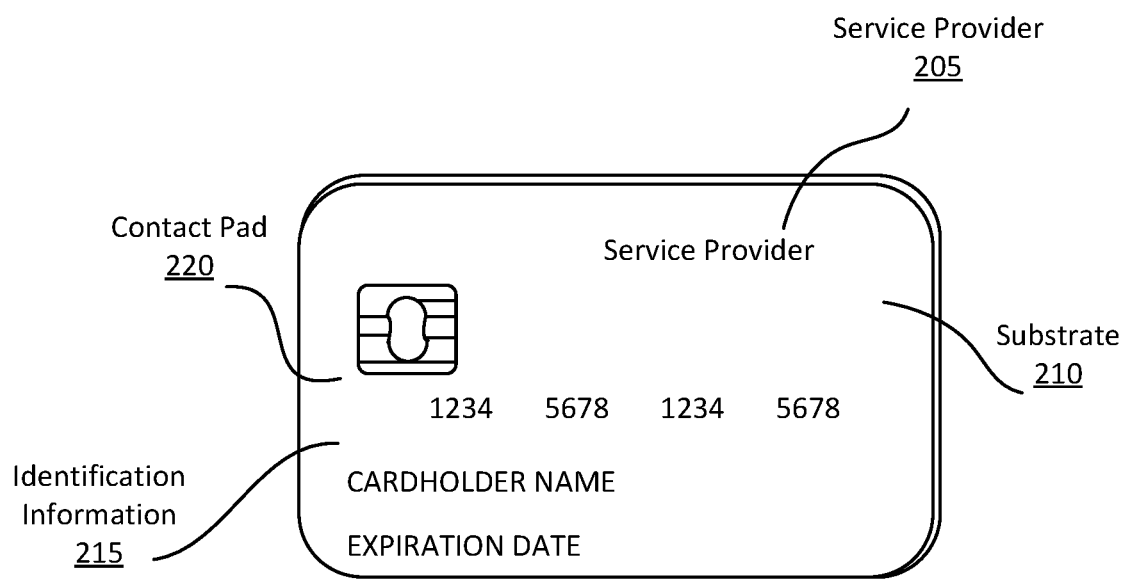
FIG. 2 is a diagram illustrating a card according to an exemplary embodiment.

FIG. 2 illustrates a contactless card 200 according to an example embodiment. The contactless card 200 may comprise a payment card, such as a credit card, debit card, or gift card, issued by a service provider 205 displayed on the front or back of the card 200. In some examples, the payment card may comprise a dual interface contactless payment card. In some examples, the contactless card 200 is not related to a payment card, and may comprise, without limitation, an identification card, a membership card, a loyalty card, a transportation card, and a point of access card.

The contactless card 200 may comprise a substrate 210, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 200 may have physical characteristics compliant with the ID-1 format of the ISO/IEC 7810 standard, and the contactless card may otherwise be compliant with the ISO/IEC 14443 standard. However, it is understood that the contactless card 200 according to the present disclosure may have different characteristics, and the present disclosure does not require a contactless card to be implemented in a payment card.

The contactless card 200 may also include identification information 215 displayed on the front and/or back of the card, and a contact pad 220. The contact pad 220 may be configured to establish contact with another communication device, such as a user device, smart phone, laptop, desktop, or tablet computer. The contactless card 200 may also include processing circuitry, antenna and other components not shown in FIG. 2 and FIG. 3. These components may be located behind the contact pad 220 or elsewhere on the substrate 210. The contactless card 200 may also include a magnetic strip or tape, which may be located on the back of the card (not shown in FIG. 2).

Figure 3:
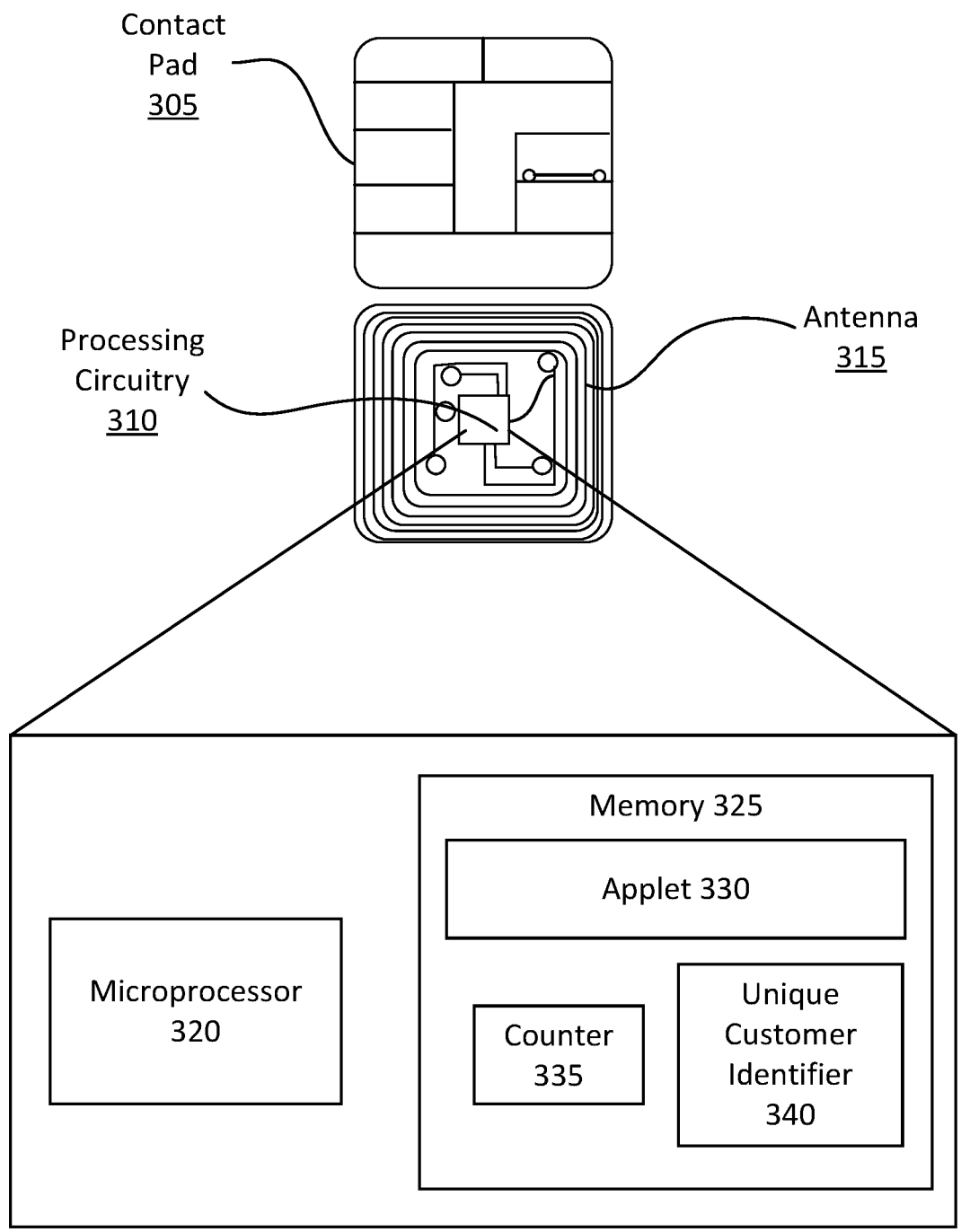
FIG. 3 is a diagram illustrating a card according to an exemplary embodiment.

FIG. 3 illustrates a contact pad 305 of a contactless card 200 according to an example embodiment.

As illustrated in FIG. 3, the contact pad 305 may include processing circuitry 310 for storing and processing information, including a microprocessor 320 and a memory 325. It is understood that the processing circuitry 310 may contain additional components, including processors, memories, error and parity/CRC checkers, data encoders, anticollision algorithms, controllers, command decoders, security primitives and tamperproofing hardware, as necessary to perform the functions described herein.

The memory 325 may be a read-only memory, write-once read-multiple memory or read/write memory, e.g., RAM, ROM, and EEPROM, and the contactless card 200 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 325 may be configured to store one or more applets 330, one or more counters 335, and a customer identifier 340. The one or more applets 330 may comprise one or more software applications configured to execute on one or more contactless cards, such as Java Card applet, and perform the functions described herein. However, it is understood that applets 330 are not limited to Java Card applets, and instead may be any software application operable on contactless cards or other devices having limited memory. The one or more counters 335 may comprise a numeric counter sufficient to store an integer. The customer identifier 340 may comprise a unique alphanumeric identifier assigned to a user of the contactless card 200, and the identifier may distinguish the user of the contactless card from other contactless card users. In some examples, the customer identifier 340 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the pad 305 or entirely separate from it, or as further elements in addition to processor 320 and memory 325 elements located within the contact pad 305.

In some examples, the contactless card 200 may comprise one or more antennas 315. The one or more antennas 315 may be placed within the contactless card 200 and around the processing circuitry 310 of the contact pad 305. For example, the one or more antennas 315 may be integral with the processing circuitry 310 and the one or more antennas 315 may be used with an external booster coil. As another example, the one or more antennas 315 may be external to the contact pad 305 and the processing circuitry 310.

In an embodiment, the coil of contactless card 200 may act as the secondary of an air core transformer. The terminal may communicate with the contactless card 200 by cutting power or amplitude modulation. The contactless card 200 may infer the data transmitted from the terminal using the gaps in the contactless card's power connection, which may be functionally maintained through one or more capacitors. The contactless card 200 may communicate back by switching a load on the contactless card's coil or load modulation. Load modulation may be detected in the terminal's coil through interference.

As explained above, the contactless cards 200 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader, and produce an NFC Data Exchange Format (NDEF) message that comprises a cryptographically secure OTP encoded as an NDEF text tag.

Figure 4:
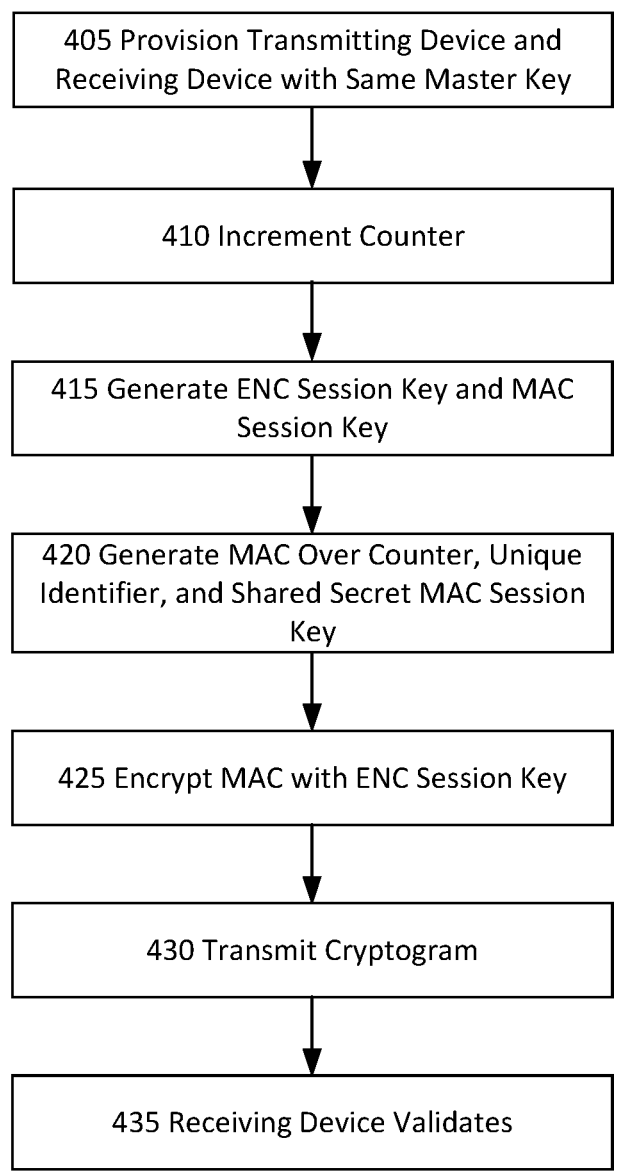
FIG. 4 is a flowchart illustrating a process according to an exemplary embodiment.

FIG. 4 is a flow chart of method 400 of key diversification according to an example of the present disclosure.

In some examples, a sender and recipient may desire to exchange data via a transmitting device and a receiving device. In some embodiments, the transmitting device is the contactless card and the receiving device is the server. It is understood that one or more transmitting devices and one or more receiving devices may be involved so long as each party shares the same shared secret symmetric key. In some examples, the transmitting device and receiving device may be provisioned with the same master symmetric key. In other examples, the transmitting device may be provisioned with a diversified key created using the master key. In some examples, the symmetric key may comprise the shared secret symmetric key which is kept secret from all parties other than the transmitting device and the receiving device involved in exchanging the secure data. It is further understood that part of the data exchanged between the transmitting device and receiving device comprises at least a portion of data which may be referred to as the counter value. The counter value may comprise a number that changes each time data is exchanged between the transmitting device and the receiving device.

The transmitting device and the receiving device may be configured to communicate via NFC, Bluetooth, RFID, Wi-Fi, and/or the like. The transmitting device and the receiving device may be network-enabled computer devices. In some examples, the transmitting device may comprise a contactless card and the receiving device may comprise a server. In other examples, the receiving device may comprise a user device or a user device application.

The method 400 can begin with step 405. In step 405, a transmitting device and receiving device may be provisioned with the same master key, such as the same master symmetric key. When the transmitting device is preparing to process the sensitive data with symmetric cryptographic operation, the transmitting device may update a counter. In addition, the transmitting device may select an appropriate symmetric cryptographic algorithm, which may include at least one of a symmetric encryption algorithm, HMAC algorithm, and a CMAC algorithm. In some examples, the symmetric algorithm used to process the diversification value may comprise any symmetric cryptographic algorithm used as needed to generate the desired length diversified symmetric key. Non-limiting examples of the symmetric algorithm may include a symmetric encryption algorithm such as 3DES or AES128, a symmetric HMAC algorithm, such as HMAC-SHA-256, and a symmetric CMAC algorithm, such as AES-CMAC.

In step 410, the transmitting device may take the selected cryptographic algorithm, and using the master symmetric key, process the counter value. For example, the transmitting device may select a symmetric encryption algorithm, and use a counter which updates with every conversation between the transmitting device and the receiving device. The one or more counters may comprise a numeric counter sufficient to store an integer. The transmitting device may increment the counter one or more times.

In step 415, the transmitting device generates two session keys: one ENC (encryption) session key and one MAC (message authentication code) session key. The transmitting device may encrypt the counter value with the selected symmetric encryption algorithm using the master symmetric key to create a session key.

In step 420, the transmitting device generates the MAC over the counter, the unique customer identifier, and the shared secret MAC session key. The customer identifier may comprise a unique alphanumeric identifier assigned to a user of the contactless card, and the identifier may distinguish the user of the contactless card from other contactless card users. In some examples, the customer identifier may identify both a customer and an account assigned to that customer and may further identify the contactless card associated with the customer's account.

In step 425, the transmitting device encrypts the MAC with the ENC session key. As encrypted, the MAC can become a cryptogram. In some examples, a cryptographic operation other than encryption may be performed, and a plurality of cryptographic operations may be performed using the diversified symmetric keys prior to transmittal of the protected data. In some examples, the MAC cryptogram can be a digital signature used to verify user information. Other digital signature algorithms, such as public key asymmetric algorithms, e.g., the Digital Signature Algorithm and the RSA algorithm, or zero knowledge protocols, may be used to perform this verification.

In step 430, the transmitting device transmits a cryptogram to the receiving device. The cryptogram can include the applet information, the unique customer identifier, the counter value, and the encrypted MAC.

In step 435, the receiving device validates the cryptogram.

Figure 5:
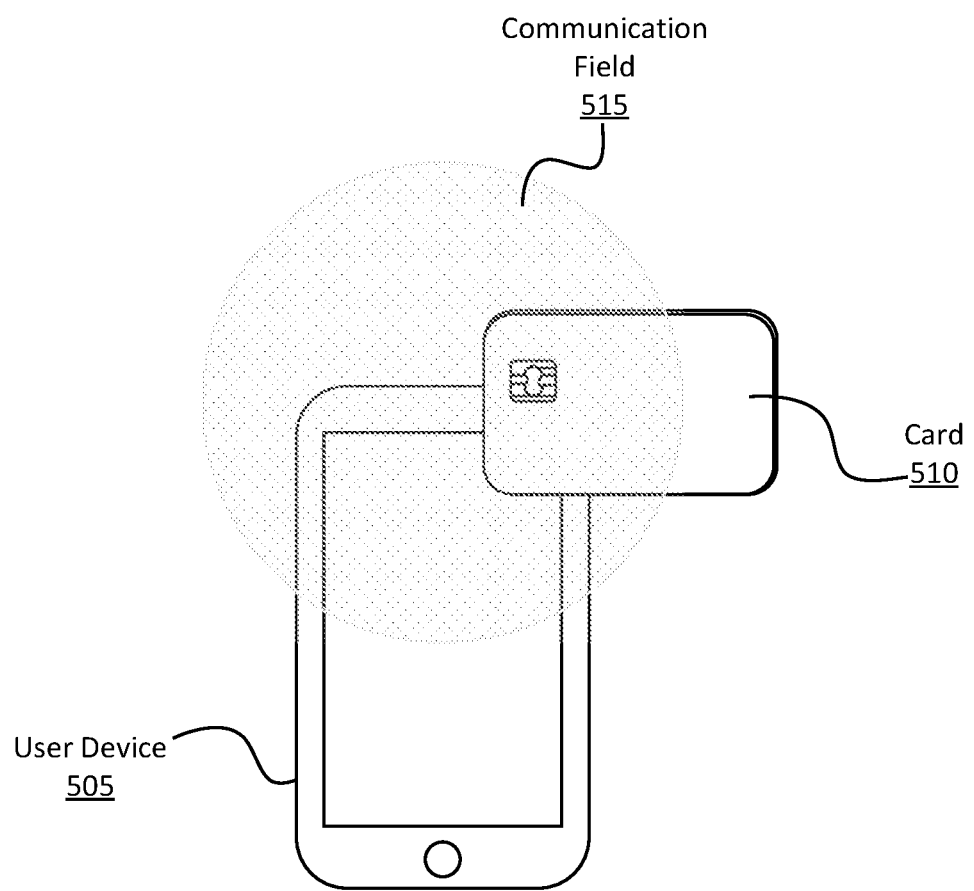
FIG. 5 is a diagram illustrating system according to an exemplary embodiment.

FIG. 5 is a diagram illustrating near field communication (NFC) according to an exemplary embodiment.

Generally, NFC is the transmission of data through electromagnetic radio fields which enable two or more devices to communicate with each other without touching. NFC operates at 13.56 MHz on ISO/IEC 18000-3 air interface and at rates ranging from 106 kbit/s to 424 kbit/s. When two NFC-enabled devices are placed within a very small distances (e.g. a few centimeters), they can perform a transaction of information. NFC is beneficial to consumer transactions because it allows for near instantaneous reading of information. The receiving device reads the transmitted data the instant that it is sent. Therefore, human error is greatly reduced. Additionally, NFC reduces the time need to read a card. Rather than swipe a card through a reader, a consumer can simply touch the card or user device to an NFC enabled reader. Additionally, NFC reduces the risk of interference from fraudulent parties. Because NFC devices may communicate only over a very short distance, it is extremely difficult to intercept the information being sent between the devices.

Some examples of NFC communication include NFC card emulation where smartphones act like smart cards allowing users to perform transactions such as payment. As another example, NFC reader/writer communication allows devices to read information stored on NFC tags embedded into labels or smart posters. As another example, NFC peer-to-peer communication allows two NFC-enabled devices to communicate with each other to exchange information.

NFC standards cover communications protocols and data exchange formats, and are based on existing RFID standards including ISO/IEC 14443 and FeliCa. The standards include ISO/IEC 18092 and those defined by the NFC Forum.

In FIG. 5, a user device 505 and a contactless card 510 are interacting within an NFC field 515. The user device is further explained with reference to FIG. 1. The contactless card is further explained with reference to FIGS. 2 and 3. Both the user device and contactless card may be enabled with NFC technology. The user and the card are in close contact with each other so that they can exchange information within the communication field. The user device can include without limitation a computer-enabled device such as a card reading terminal, smart phone, computer, or other device. The device may or may not be associated with the card issuer. It is understood that the client device may not be connected to an external network. That is, the client device may conduct the sharing of information offline.

Figure 6:
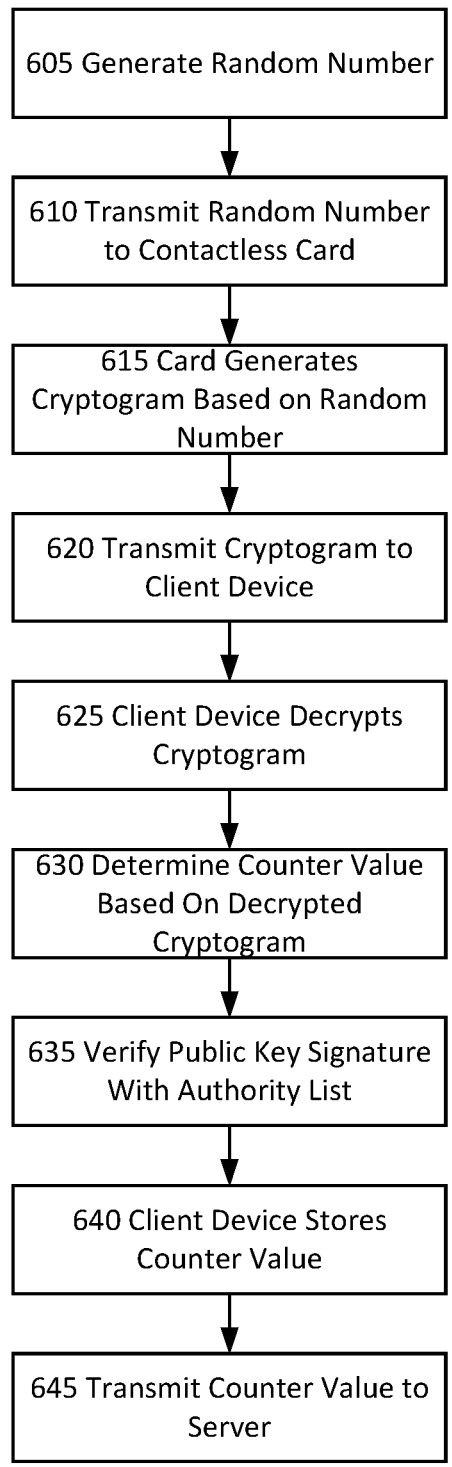
FIG. 6 is a flowchart illustrating a process according to an exemplary embodiment.

FIG. 6 is a flowchart illustrating a method according to an exemplary embodiment.

The method 600 can include a client device, a card, and one or more servers. The client device can be a computer-enabled smart device such as a smart phone, smart watch, personal computer, card reader, or some other merchant device. The card can include a contactless card. The card can be associated with one or more financial accounts such as a spending account, savings account, investment account, credit account or some other account associated with a banking or financial institution. Regarding decryption capabilities, the client device and the card can be provisioned with the same master key.

In action 605, the client device can generate a random number. This action can be performed by a processor associated with the client device. The random number can be generated by a predetermined function such as a hash function. Having produced the random number, in action 610 the client device can transmit the number to the contactless card. To transmit the random number, the client device can open a communication field. The communication field can include without limitation a near-field communication (NFC) field, a Bluetooth field, or a radio frequency identification (RFID) field. Communication fields are discussed further with reference to FIG. 5. Once the communication field is opened, the card may enter the communication field and receive the random number from the client device. Through the communication field, the random number can be sent by a processor associated with the client device. It is understood that the client device may open a communication field one or more times in response to requests received from either the card, the server, or some other device. Upon receiving the random number, in action 615 the card can generate a cryptogram based on the random number. Generally, a cryptogram is one or more encrypted texts. The card can create the cryptogram by encrypting the random number, the counter number, and the private key associated with the card. The counter number can be previously incremented in response to initiating a communication with the client device. It is understood that the card can generate the cryptogram over other information including without limitation the card's unique identifier. Additionally, the card can generate a message authentication code (MAC) over the counter, a unique identifier, and a session key. The generation of a MAC as well as other aspects of a diversified session key exchange are discussed with further reference to FIG. 4. The encryption can be performed by some predetermined encryption algorithm or diversified key exchange. In addition to generating the cryptogram over the random number, the card may also store the random number in its memory. Once the cryptogram is generated, in action 620 the card transmits the cryptogram to the client device. This action can be performed over a communication field or a wireless network. Alternatively, the client device may receive the cryptogram even when the client device is not connected to an external network. That is, the client device may receive the cryptogam locally. Furthermore, this action can be performed by a processor or microprocessor associated with the card. Having received the cryptogram, in action 625 the client device can decrypt the cryptogram. The client device can perform the decryption by using the shared master or public key. Additionally, the client device can use a private key or a derived session key. Diversified session key exchange is discussed with further reference to FIG. 4. Additionally, the cryptogram can be validated with a secret key by the client application. The secret key may be derived from the information contained in the cryptogram or it may be provisioned by other methods. The secret key may be stored in the memory of a server or within the hardware security module of the client device. In action 630, the client device can determine the counter value based on the decrypted cryptogram. Additionally, the client device determines the private key and public key signature from the cryptogram. In action 635, the client device can verify the public key signature from the cryptogram with an authority list from a Certificate Authority (CA). Generally, a CA is a trusted organization that verifies websites and other entities through public key infrastructure (PKI). An authority list is a list of certificates maintained or stored by the CA for the purpose of authorizing transactions using public keys. The authority list may be requested or retrieved by the processor over a network. Having verified the public key, in action 640 the client device can store the counter value in its memory. The client device may store the counter value for the purpose of verifying future transactions. As a nonlimiting example, the client device may reference the stored counter number when verifying the next transaction involving the card. In action 645, the client device can transmit the counter value to the server. The counter value may be transmitted over a wireless network. The server can store the counter value in a database or data storage unit for future reference.

Figure 7A:
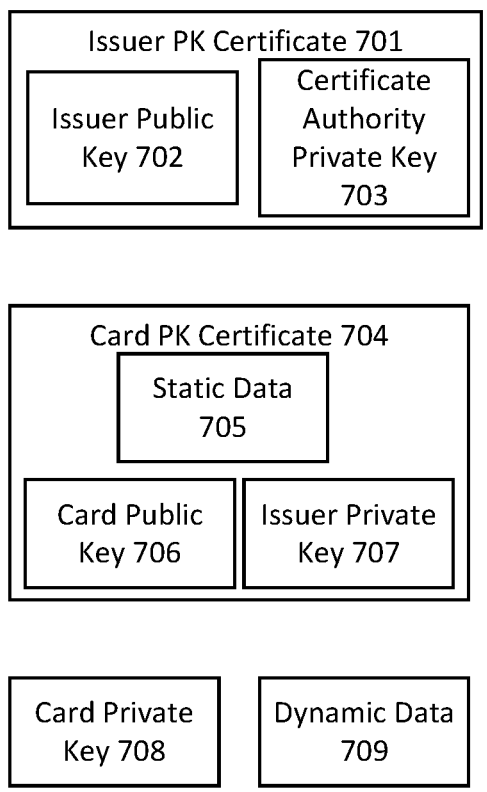
FIGS. 7A, 7B, and 7C are flowcharts illustrating processes according to an exemplary embodiment.
Figure 7B:
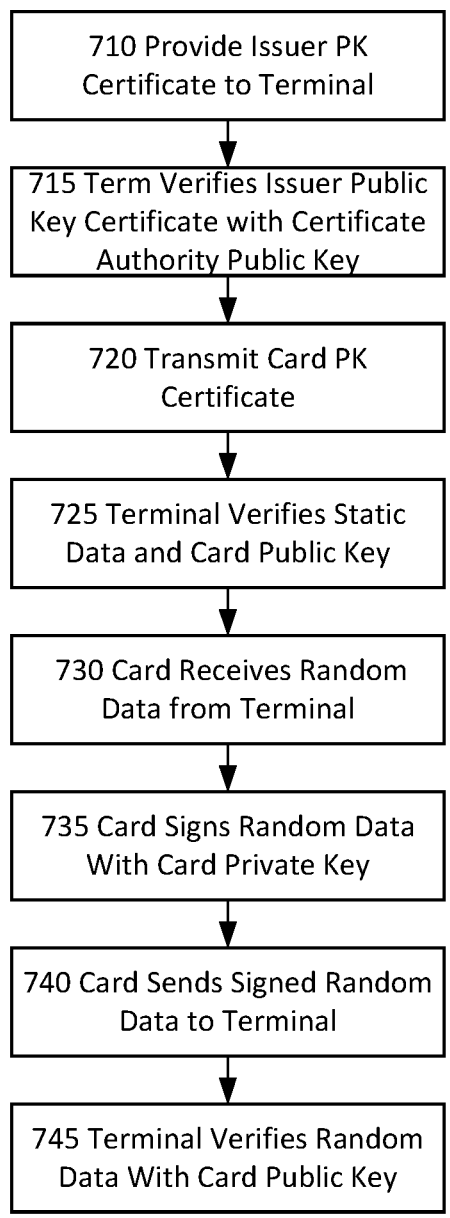
Figure 7C:
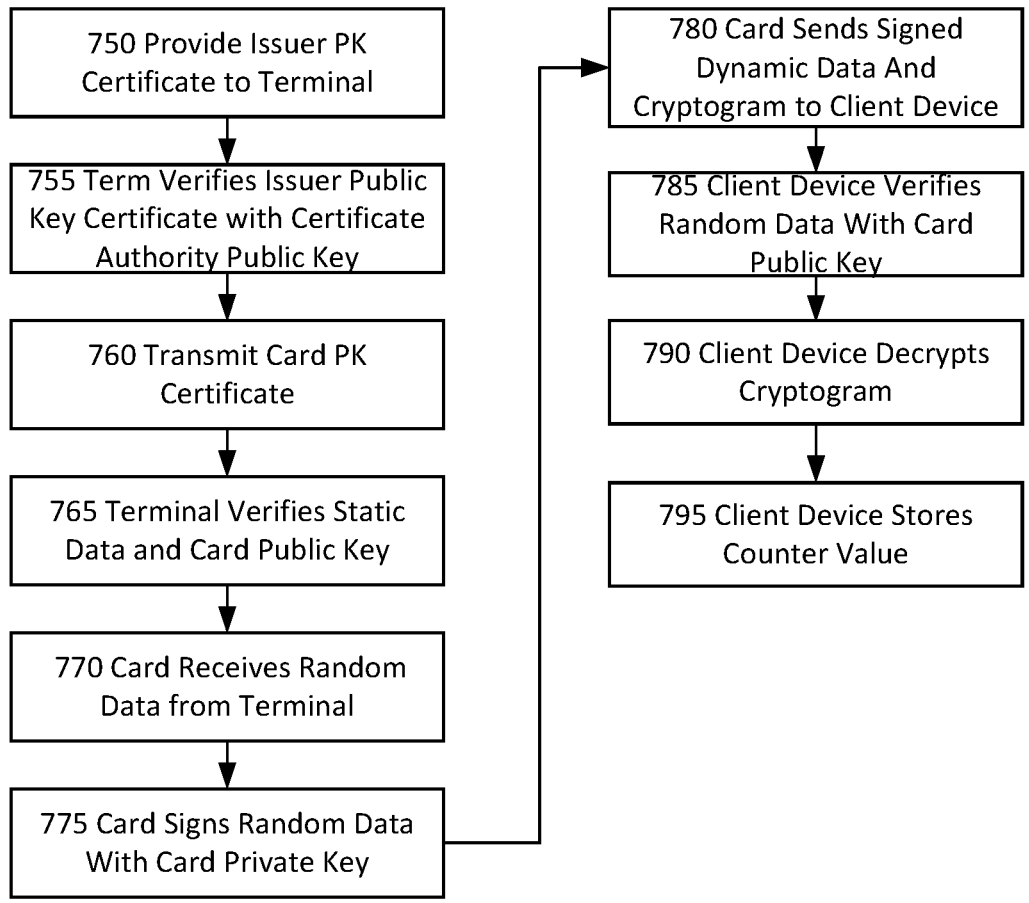

It is understood that the authentication of the card can be a dynamic authentication process (DDA) or a combined dynamic authentication process (CDA) discussed with further reference to FIGS. 7A-7C.

FIG. 7A illustrates the one or more elements present in a public key authentication of a card. An issuer public key (PK) certificate 701 can include an issuer public key 702 and a certificate authority private key 703. A card public key certificate 704 can include static data 705, a card public key 706, and an issuer private key 707. Other elements include a card private key 708 and dynamic data 709. The issuer can be without limitation an institution or entity that provides the card to the user.

FIGS. 7B-7C are flowcharts illustrating a method according to an exemplary embodiment. The client device can send the counter values to the first and second servers over an internal or external network such as static data authentication (SDA), dynamic data authentication (DDA), or combined data authentication (CDA). SDA can determine that the data read from the chip associated with the card has not been manipulated or changed since it was issued, although SDA does not determine that the card itself is genuine. DDA determines that both the card and the data read from the chip associated with the card are genuine. DDA authenticates the card by performing offline dynamic authentication using data from the terminal or client device generated for each transaction. CDA authenticates the card by combining the digital signature with the generation of the application cryptogram to verify that the cryptogram came from a valid card.

FIG. 7A describes an exemplary embodiment of a method of card authentication using dynamic data authentication (DDA). DDA can include without limitation an issuer public key certificate further including an issuer public key and certificate authority private key; a card public key certificate including a card public key, an issuer private key, and some predetermined static data; a card private key; and some dynamic data that is created specifically for each transaction such that each dynamic datum is different. It is understood that DDA can be performed locally or offline.

The exemplary processes in FIGS. 7B and 7C are described under the assumption that a card is interacting with a client device discussed with further reference to FIG. 1. However, in each action described in FIGS. 7B and 7C, it is understood that the action can be performed by a processor associated with the card, the client device, or a server. The actions of transmitting and receiving can be done over one or more wired or wireless networks, including but not limited to one or more of NFC fields, RFID fields, or Bluetooth.

In action 710, the card transmits the issuer public key certificate to client device. In action 715, the client device can verify the issuer public key certificate with a certificate authority public key which was previously provisioned to the client device. In action 720, the card can transmit the card public key certificate to the client device. In action 725, the client device can verify or validate the static data sent in the card public key certificate as well as the card public key. In action 730, the card receives dynamic data from the client device. The dynamic data can be unique to every transaction. In action 735, the card signs the dynamic data with the card private key. In action 740, the card transmits the signed dynamic data to the client device. In action 745, the client device verifies the signed dynamic data with the card public key. Thus, the client device verifies the card with dynamic data.

In FIG. 7C the card and client device can engage in combined data authentication (CDA). CDA follows the same steps of DDA except that CDA includes the exchange of a cryptogram. The CDA process is similar to the DDA process except that when the card sends the final card certificate, the card also sends the cryptogram. It is understood that CDA can be performed locally or offline. By storing the counter value among multiple devices and servers, this system and method further protects the user from fraudulent hacking or other nefarious uses of the card.

In action 750, the card transmits the issuer public key certificate to client device. In action 755, the client device can verify the issuer public key certificate with a certificate authority public key which was previously provisioned to the client device. In action 760, the card can transmit the card private key certificate to the client device. In action 765, the client device can verify or validate the static data sent in the card public key certificate as well as the card public key. In action 770, the card receives dynamic data from the client device. The dynamic data can be unique to every transaction. In action 775, the card signs the dynamic data with the card private key. In action 780, the card can send the dynamic data signed with the private key as well as a cryptogram to the client device. The cryptogram in FIG. 7C may be the same cryptogram described in FIG. 6, but it is understood that the present disclosure is not limited thereto. In action 785, the client device verifies the random data with the card public key. In action 790, the client device decrypts a cryptogram sent from the card.

Exemplary embodiments of the process of receiving a cryptogram from the card are described with further reference to FIG. 6. Generally, this action can be performed by a processor associated with the client device. Upon decrypting the cryptogram, the client device gets the counter value from the card in addition to the card's private key and public key signature. In action 795, the client device can store the counter value in the client device, a first server, and a second server. These actions can be performed by a processor associated with the client device. The client device can be a computer-enabled smart device such as a smart phone, smart watch, personal computer, card reader, or some other merchant device. The first server and second server can be associated without limitation with one or more financial institutions, merchant institutions, security institutions, or other secure institution. By storing the counter value among the client device and the servers, the method ensures that the counter value is synced among more than one organization. It is understood that other information associated with the card and the transaction may be stored in the client device or the servers. As a nonlimiting example, the client application can transmit the transaction amount associated with the cryptogram to the client device or the servers. As another nonlimiting example, the client device may store a secret key within the hardware of the client device or the application may transmit the secret key to one or more servers. The client application may also store the signature authority list in the memory of the client device and one or more servers.

It is understood that when the counter value is changed or updated, the client application can call an application programming interface (API) to update the counter value within the records of the client device and servers.

Furthermore, if the client device becomes de-synced from the card, the device can connect with one of the servers to re-sync with the counter value. This avoids the situation where the client device must wait until the next transaction with the card to re-sync the counter value. It is understood that although two servers are depicted in FIG. 6, any number of servers can be used. Furthermore, it is understood that the client device and the servers can engage in independent verification processes before sending and receiving counter values.

Figure 8:
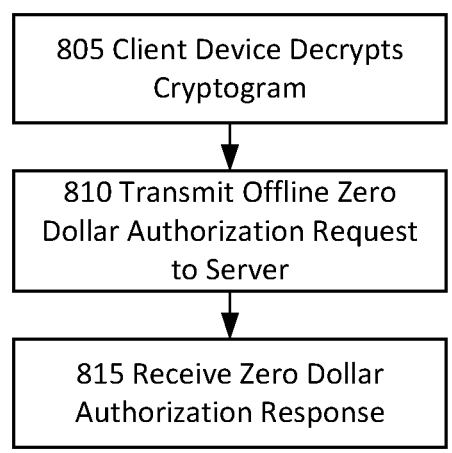
FIG. 8 is a flowchart illustrating a process according to an exemplary embodiment.

FIG. 8 is a flowchart illustrating a method according to an exemplary embodiment.

In action 805, the client device decrypts the cryptogram sent by the card. The generating and transmission of the cryptogram is discussed further with reference to FIG. 6. In addition to decrypting the cryptogram as a means of verifying the card information, the client device may also send an authorization request to a server associated with a card issuer. It is understood that the client device may or may not be associated with a card issuer.

In action 810, the client device can send a zero dollar authorization request to the card issuer server. Generally, the zero dollar authorization request is a request aimed to validate an account number associated with a card. Rather than validate the card through a normal transaction, the server associated with the card issuer may perform a $0.00 transaction or an otherwise very small transaction such as $0.0250. Thus, the zero dollar authentication validates the card without charging it. Additionally, the zero dollar authorization request can validate a card verification value (CVV) and address verification service (AVS). The zero dollar authorization request simulates a transaction without charging any money to the cardholder's account.

In action 815, the client device can receive a zero dollar authorization response from the server. The response can be sent over a network. The response can be sent once the server determines that the account associated with the card has sufficient funds or some other element is verified. Additionally, the client application can send the offline zero dollar amount request to one or more servers based on the cryptogram.

The authorization process can be conducted online or offline. Generally, an offline EMV authorization is a transaction resulting from a request by a card-reading terminal (i.e. the client device) to the card for approval of a transaction without requesting online authorizations from the issuer host. Both the card and the client device must support and be certified for offline authorization in order for offline authorization to occur. It is understood that the client applicant may not be associated with an issuer of a contactless card.

When an offline authorization is possible, the client device may use an application certification (AC) to the ask the chip associated with the card to approve of the transaction. The chip can respond with either a transaction certificate (TC) as approval of the transaction or respond with an application authentication cryptogram (ACC) and indicate that it is declining the transaction. Furthermore, the client device may perform a deferred authorization. A deferred authorization is an authorization request or financial request that can occur when online connectivity is briefly not available. While online capabilities are paused, the client device may hold the transaction until connectivity is restored. Once connectivity is restored, the client device may send an authorization request to the issuer.

The offline authorization described in FIG. 8 may be associated with Europay, MasterCard, and Visa (EMV) standards. Additionally, the offline authorization processes described in FIG. 8 may be a dynamic data authentication process (DDA) or combined dynamic authentication process (CDA) discussed with further reference to FIG. 7.

In some aspects, the techniques described herein relate to a method for synchronizing a counter value, including: receiving, by a contactless card having a processor and memory, a random number, wherein the memory further includes a counter value, a public key, and a private key; generating, by the contactless card, a cryptogram based on the random number, the private key, and the counter value, wherein the cryptogram is further configured to be decrypted by one or more applications via the public key corresponding to the private key, wherein the decryption of the cryptogram results in finding the counter value, and wherein the counter value is further configured to be stored in a memory and a server.

In some aspects, the techniques described herein relate to a method, wherein the method further includes the steps of: generating, by a client application, the random number; transmitting, by the client application, the random number to the contactless card; decrypting the cryptogram, by the client application based on the public key and the random number; determining, by the client application, the counter value based on the decrypted cryptogram; authenticating, by the client application, a signature of the public key with a signature authority list; storing, by the client application, the counter value in a memory; and transmitting, by the client application, the counter value to a server.

In some aspects, the techniques described herein relate to a method, wherein the counter value is stored in a memory of a client device by the client application.

In some aspects, the techniques described herein relate to a method, wherein the counter value is stored in a memory of a second server by the client application.

In some aspects, the techniques described herein relate to a method, wherein the contactless card transmits the cryptogram to the client application when the client application is not connected to an external network.

In some aspects, the techniques described herein relate to a method, wherein the client application transmits the counter value to the server over an external network when the client application is connected to the external network.

In some aspects, the techniques described herein relate to a method, wherein the authenticating of the public key signature is a dynamic data authentication process.

In some aspects, the techniques described herein relate to a method, wherein the dynamic data authentication process is performed locally.

In some aspects, the techniques described herein relate to a method, wherein the authenticating of the public key signature is a combined dynamic data authentication process wherein the client application transmits an indication of a transaction amount associated with the cryptogram to the server.

In some aspects, the techniques described herein relate to a method, wherein the cryptogram is validated with a secret key by the client application.

In some aspects, the techniques described herein relate to a system for synchronizing a counter value, including: a contactless card having a processor and memory, the memory of the contactless card containing a counter value, a public key, and a private key, wherein the contactless card is configured to: receive a random number, and generate a cryptogram based on the random number, the private key, and the counter value, wherein the cryptogram is further configured to be decrypted by one or more applications via a public key corresponding to the private key, wherein the decryption of the cryptogram results in finding the counter value, and wherein the counter value is further configured to be stored in a memory and server.

In some aspects, the techniques described herein relate to a system, wherein the system further includes: a client device having a client application including instructions for execution on the client device; wherein the client application is configured to: generate the random number, transmit the random number to the contactless card, receive the cryptogram and the public key from the contactless card, decrypt the cryptogram using the public key and the random number, determine the counter value based on the decrypted cryptogram, verify a signature of the public key with a signature authority list, store the counter value in a memory of the client device, and transmit the counter value to a server.

In some aspects, the techniques described herein relate to a system, wherein the signature authority list is stored in a memory of the client device.

In some aspects, the techniques described herein relate to a system, wherein the client application is configured to authenticate the contactless card upon a reception of the cryptogram when the client device is not connected to an external network.

In some aspects, the techniques described herein relate to a system, wherein the client application is configured to transmit the counter value to the server when the client device is connected to the external network.

In some aspects, the techniques described herein relate to a system, wherein the client application is further configured to call an application programming interface to update a counter value of record to the counter value.

In some aspects, the techniques described herein relate to a system, wherein the client application is associated with an issuer of the transmitting device.

In some aspects, the techniques described herein relate to a system, wherein the client application is further configured to transmit an offline zero dollar authorization request to the server based on the cryptogram.

In some aspects, the techniques described herein relate to a computer readable non-transitory medium including computer executable instructions that, when executed on a processor, configure the processor to perform procedures including: receiving a random number, generating, a cryptogram based on the random number, a private key, and a counter value, wherein the cryptogram is further configured to be decrypted by one or more applications via a public key corresponding to the private key, wherein the decryption of the cryptogram results in finding the counter value, and wherein the counter value is further configured to be stored in a memory and server.

In some aspects, the techniques described herein relate to a computer readable non-transitory medium, further configured, when executed on a processor, to perform via the processor the procedures including: generating a random number; transmitting, the random number to a contactless card; decrypting the cryptogram based on the public key and the random number; determining the counter value based on the decrypted cryptogram; verifying a signature of the public key with a signature authority list; storing the counter value in a memory of a client device; and transmitting the counter value to a server.

Although embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes. The invention should therefore not be limited by the above described embodiments, method, and examples, but by all embodiments within the scope and spirit of the invention as claimed.

In the invention, various embodiments have been described with references to the accompanying drawings. It may, however, be evident that various modifications and changes may be made thereto, and additional embodiments may be implemented, without departing from the broader scope of the invention as set forth in the claims that follow. The invention and drawings are accordingly to be regarded in an illustrative rather than restrictive sense.

The invention is not to be limited in terms of the particular embodiments described herein, which are intended as illustrations of various aspects. Many modifications and variations can be made without departing from its spirit and scope. Functionally equivalent systems, processes and apparatuses within the scope of the invention, in addition to those enumerated herein, may be apparent from the representative descriptions herein. Such modifications and variations are intended to fall within the scope of the appended claims. The invention is to be limited only by the terms of the appended claims, along with the full scope of equivalents to which such representative claims are entitled.

As used herein, the terms "card," "transaction card," and "contactless card" are not limited to a particular type of card. Rather, it is understood that these terms can refer to a contact-based card, a contactless card, or any other card, unless otherwise indicated. It is further understood that the present disclosure is not limited to cards having a certain purpose (e.g., payment cards, gift cards, identification cards, or membership cards), to cards associated with a particular type of account (e.g., a credit account, a debit account, a membership account), or to cards issued by a particular entity (e.g., a financial institution, a government entity, or a social club). Instead, it is understood that the present disclosure includes cards having any purpose, account association, or issuing entity.

As used herein, user information, personal information, and sensitive information can include any information relating to the user, such as a private information and non-private information. Private information can include any sensitive data, including financial data (e.g., account information, account balances, account activity), personal information/personally-identifiable information (e.g., social security number, home or work address, birth date, telephone number, email address, passport number, driver's license number), access information (e.g., passwords, security codes, authorization codes, biometric data), and any other information that user may desire to avoid revealing to unauthorized persons. Non-private information can include any data that is publicly known or otherwise not intended to be kept private.

It is further noted that the systems and methods described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified herein. These computer-readable program instructions may also be stored in a computer-readable storage medium that can direct a computer, a programmable data processing apparatus, and/or other devices to function in a manner, such that the computer readable storage medium having instructions stored therein comprises an article of manufacture including instructions which implement aspects of the functions specified herein.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions specified herein.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

The preceding description of exemplary embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

What is claimed is:

1. A method for synchronizing a counter value, comprising:
   receiving, by a contactless card having a processor and a memory, a random number,
      wherein the memory comprises a counter value, a public key, and a private key;
   generating, by the contactless card, a cryptogram based on the random number, the private key, and the counter value, the cryptogram including an encrypted version of the counter value;
   transmitting, by the contactless card to a client application of a client device, the cryptogram, including the encrypted version of the counter value, when the client application is not connected to an external network;
   transmitting, by the contactless card to the client application of the client device, an issuer public key certificate, the issuer public key certificate including an issuer public key, a certificate authority private key, and static data;
   verifying, by the client application of the client device, the issuer public key certificate with a certificate authority public key which was previously provisioned to the client device when the client device was connected to the external network;
   verifying, by the client application of the client device, the static data;
   decrypting, by the client application, the cryptogram using the public key and the random number that was generated by the client application, wherein decrypting the cryptogram includes decrypting the encrypted version of the counter value, thereby providing the counter value, as decrypted, to the client application;
   storing the counter value into memory on the client device; and
   calling, by the client application, an application programming interface to update the counter value within a first server to thereby synchronize the counter value between the contactless card, the client device, and the first server;
   wherein, in response to the client device determining that the counter value of the client device later becomes unsynchronized with at least the first server, the method further includes the client application communicating with the first server to synchronize the counter value with the first server without waiting for a new interaction with the contactless card.

2. The method of claim 1, wherein the method further comprises the steps of:
   transmitting, by the client application, the random number to the contactless card, before the cryptogram is generated; and
   authenticating, by the client application, a signature of the public key with a signature authority list.

3. The method of claim 2, wherein the counter value is stored in the memory of the client device by the client application.

4. The method of claim 2, wherein the counter value is sent by the client application to a second server to be stored in a memory of the second server.

5. The method of claim 2, wherein the client application transmits the counter value to the first server over the external network when the client application is connected to the external network.

6. The method of claim 2, wherein the authenticating of the signature of the public key is a dynamic data authentication process.

7. The method of claim 6, wherein the dynamic data authentication process is performed locally.

8. The method of claim 2, wherein the authenticating of the signature of the public key is a combined dynamic data authentication process wherein the client application transmits an indication of a transaction amount associated with the cryptogram to the first server.

9. The method of claim 7, wherein the cryptogram is validated with a secret key by the client application.

10. The method of claim 1, wherein:
    the memory further comprises a unique identifier associated with the card, and
    the cryptogram is generated based on the random number, the private key, the counter value, and the unique identifier.

11. The method of claim 2, wherein the method further comprises the step verifying, by the client application with the counter value, a transaction involving the contactless card.

12. A system for synchronizing a counter value, comprising:
    a contactless card having a processor and a memory, the memory of the contactless card containing a counter value, a public key, and a private key, wherein the contactless card is configured to:
       receive a random number; and
       generate a cryptogram based on the random number, the private key, and the counter value, the cryptogram including an encrypted version of the counter value; and
    a client device having a client application comprising instructions for execution on the client device, wherein the client application is configured to:
       receive, from the contactless card when the client application is not connected to an external network, the cryptogram, including the encrypted version of the counter value;
       receive, from the contactless card, an issuer public key certificate, the issuer public key certificate including an issuer public key, a certificate authority private key, and static data;
       verify the issuer public key certificate with a certificate authority public key which was previously provisioned to the client device when the client device was connected to the external network;

verify the static data;

decrypt the cryptogram using the public key and the random number that was generated by the client application, wherein decrypting the cryptogram includes the client application to decrypt the encrypted version of the counter value, thereby providing the counter value, as decrypted, to the client application;

store the counter value into memory on the client device; and call an application programming interface to update the counter value within a first server to thereby synchronize the counter value between the contactless card, the client device, and the first server;

wherein, in response to the client device determining that the counter value of the client device later becomes unsynchronized with at least the first server, the client device is further configured to communicate with the first server to synchronize the counter value with the first server without waiting for a new interaction with the contactless card.

13. The system of claim 12, wherein the client application is configured to:

transmit the random number to the contactless card before the cryptogram is generated, receive the public key from the contactless card, and verify a signature of the public key with a signature authority list.

14. The system of claim 13, wherein the signature authority list is stored in the memory of the client device.

15. The system of claim 13, wherein the client application is configured to transmit the counter value to the first server when the client device is connected to the external network.

16. The system of claim 12, wherein the client application is associated with an issuer of the contactless card.

17. The system of claim 13, wherein the client application is further configured to transmit an offline zero dollar authorization request to the first server based on the cryptogram.

18. A computer readable non-transitory medium comprising computer executable instructions that, when executed on one or more processors, configure the one or more processors to perform procedures comprising:

receiving, at a contactless card, a random number;

generating a cryptogram based on the random number, a private key, and a counter value, the cryptogram including an encrypted version of the counter value;

transmitting the cryptogram, including the encrypted version of the counter value, to a client application of a client device when the client application is not connected to an external network;

transmitting an issuer public key certificate, the issuer public key certificate including an issuer public key and a certificate authority private key;

verifying the issuer public key certificate with a certificate authority public key which was previously provisioned to the client device when the client device was connected to the external network, decrypting the cryptogram using the public key and the random number that was generated by the client application, wherein decrypting the cryptogram includes decrypting the encrypted version of the counter value, thereby providing the counter value, as decrypted, to the client application;

storing the counter value into memory on the client device; and calling an application programming interface to update the counter value within a first server to thereby synchronize the counter value between the contactless card, the client device, and the first server;

wherein, in response to the client device determining that the counter value of the client device later becomes unsynchronized with at least the first server, the procedures further include the client application communicating with the first server to synchronize the counter value with the first server without waiting for a new interaction with the contactless card.

19. The computer readable non-transitory medium of claim 18, wherein the computer executable instructions that, when executed on the one or more processors, further configure the one or more processors to perform procedures comprising:

transmitting, the random number to the contactless card, before the cryptogram is generated; and verifying a signature of the public key with a signature authority list.

* * * * *